United States Patent [19]
Sakakibara et al.

[11] 3,891,614
[45] June 24, 1975

[54] SOLID PHASE SYNTHESIS OF CALCITONINS ON BENZHYDRYLAMINE TYPE RESINS

[75] Inventors: Kyoichi Sakakibara, Chigasaki; Masaaki Gondoh, Kawasaki; Eiichirou Shimazawa, Sagamihara; Nobuo Izumiya, Fukuoka, all of Japan

[73] Assignee: Teikoku Hormone Mfg. Co., Ltd., Tokyo, Japan

[22] Filed: Dec. 5, 1973

[21] Appl. No.: 421,825

[30] Foreign Application Priority Data
Dec. 7, 1972   Japan.............................. 47-121973

[52] U.S. Cl. ............................................ 260/112.5
[51] Int. Cl...... C07c 103/52; C07g 7/00; C08h 1/00
[58] Field of Search .................... 260/112.5, 112.5 T

[56] References Cited
UNITED STATES PATENTS

| | | | |
|---|---|---|---|
| 3,749,703 | 7/1973 | Guttmann et al................ | 260/112.5 |
| 3,798,203 | 3/1974 | Brugger et al.................. | 260/112.5 |
| 3,801,561 | 4/1974 | Guttmann et al................ | 260/112.5 |

*Primary Examiner*—Lewis Gotts
*Assistant Examiner*—Reginald J. Suyat
*Attorney, Agent, or Firm*—Sherman & Shalloway

[57] ABSTRACT

A novel process for synthesizing calcitonins composed of 32 amino acid units, which comprises bonding a proline residue through an acid amide linkage to a resin support containing an amino group capable of being split off, successively introducing the remaining 31 constituent amino acid residues of calcitonin into the proline residue on the resin support according to the solid phase synthesizing method to form a protected calcitonin precursor, splitting off the resin support and the protective group from the calcitonin precursor, and thereafter oxidising the resulting dotriacontapeptide to bond the mercapto group of the cystein unit at the N terminal to the mercapto group of the cystein unit at the seventh position from the N terminal and to form a cyclic disulfide structure.

14 Claims, No Drawings

SOLID PHASE SYNTHESIS OF CALCITONINS ON BENZHYDRYLAMINE TYPE RESINS

This invention relates to a new process for synthesizing calcitonins, and specifically, to a process for synthesizing calcitonins by the solid phase method.

It has been known that calcitonins have a strong activity of reducing serum calcium and phosphorus, and superior pharmacological actions such as a stimulating action on bone formation, an inhibiting action on bone resorption, or a phosphaturic effect, and therefore, are useful for the treatment of diseases such as hypercalcemia, osteodystrophia, fracture, osteomalacia and rickets which are caused by the deficiency of endogenous thyrocalcitonin. Accordingly, the calcitonins have previously been extracted from the organs of various animals, and some of them have already been identified as to their structures and successfully synthesized. Examples of such calcitonins are shown below.

The term "calcitonins," as used in the present specification and claims, denotes calcitonins expressed by the following formulae and analogs thereof. Examples of the analogs are disclosed, for example, in British Pat. Specification Nos. 1,287,125 and 1,314,051.

1. Salmon-calcitonin

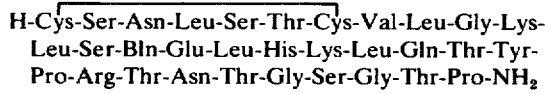
H-Cys-Ser-Asn-Leu-Ser-Thr-Cys-Val-Leu-Gly-Lys-
Leu-Ser-Bln-Glu-Leu-His-Lys-Leu-Gln-Thr-Tyr-
Pro-Arg-Thr-Asn-Thr-Gly-Ser-Gly-Thr-Pro-NH$_2$ 2. Human-calcitonin

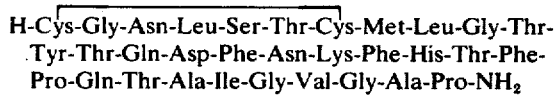
H-Cys-Gly-Asn-Leu-Ser-Thr-Cys-Met-Leu-Gly-Thr-
Tyr-Thr-Gln-Asp-Phe-Asn-Lys-Phe-His-Thr-Phe-
Pro-Gln-Thr-Ala-Ile-Gly-Val-Gly-Ala-Pro-NH$_2$ 3. Bovine-Calcitonin

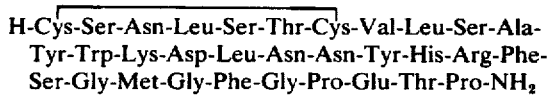
H-Cys-Ser-Asn-Leu-Ser-Thr-Cys-Val-Leu-Ser-Ala-
Tyr-Trp-Lys-Asp-Leu-Asn-Asn-Tyr-His-Arg-Phe-
Ser-Gly-Met-Gly-Phe-Gly-Pro-Glu-Thr-Pro-NH$_2$ 4. Porcine-calcitonin

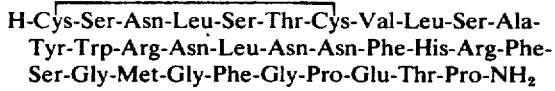
H-Cys-Ser-Asn-Leu-Ser-Thr-Cys-Val-Leu-Ser-Ala-
Tyr-Trp-Arg-Asn-Leu-Asn-Asn-Phe-His-Arg-Phe-
Ser-Gly-Met-Gly-Phe-Gly-Pro-Glu-Thr-Pro-NH$_2$ The various abbreviations given in the above formulae and in the following description have the following meanings.

Ala = alanyl group
Arg = arginyl group
Asn = asparaginyl group
Asp = aspartyl group
Cys = cysteinyl group
Gln = glutaminyl group
Glu = glutamyl group
Gly = glycyl group
His = histidyl group
Ile = isoleucyl group
Leu = leucyl group
Lys = lysyl group
Met = methionyl group
Phe = phenylalanyl group
Pro = prolyl group
Ser = seryl group
Thr = threonyl group
Trp = tryptophyl group
Tyr = tyrosyl group
Val = valyl group Synthesis of the calcitonins has been successfully carried out by the liquid phase methods, but no example of successful synthesis by the solid phase method has ever been reported.

Generally, the solid phase method has advantages over the liquid phase method in that the operation is simpler and the entire process can be automated. Nevertheless, calcitonins have not been successfully synthesized by the solid phase method for the following reasons.

The molecules of calcitonins are characterized by containing both an amino acid residue in which the carboxyl group is present as acid amide such as a proline residue at its C terminal and an amino acid residue in which the pendant carboxyl group is present in the free state such as an aspartic acid residue or glutamic acid residue. Thus when a calcitonin having such structural characteristics is to be prepared by using a usual Merrifield resin (chloromethylated styrene/divinylbenzene copolymer) which has been universally used for the solid-phase synthesis of peptide as a support, it is virtually impossible to amidate only the carboxyl group of the proline residue at the C terminal selectively while maintaining the pendant carboxyl group of the aspartic acid residue or glutamic acid residue or glutamic acid residue in the molecule of the calcitonin in the free state, whatever deprotecting reagent may be used, or whatever treatment may be followed.

The inventors of the present application have succeeded in synthesizing calcitonins by the solid phase method using a resin having an amino group capable of being split off.

Accordingly, an object of this invention is to provide a novel process for synthesizing calcitonins, especially salmon-, human-, bovine- and porcine-calcitonins by the solid phase method.

Another object of this invention is to provide a novel process for producing calcitonins of high purity in high yields.

According to this invention, there is provided a novel process for synthesizing salmon-calcitonin, human-calcitonin, bovine-calcitonin and porcine-calcitonin or analogs thereof by the solid phase method, which comprises binding a proline residue through an acid amide bond to a resin support containing an amino group capable of being split off, introducing into the proline residue on the resin support the remaining 31 constituent amino acid residues of calcitonin according to the solid phase (synthesis) method to form a protected calcitonin precursor, splitting off the resin support and the protective group from the calcitonin precursor, and then oxidizing the resulting dotriacontapeptide thereby to bond the mercapto group of the cysteine unit at the N terminal to the mercapto group of the cysteine unit at the seventh position from the N terminal and to form a cyclic disulfide structure.

A first feature of the novel synthesizing method of this invention is that the synthesis of calcitonins is carried out by the solid phase method using a specific resin support. In the present invention, a resin containing an amino group capable of being split off is used as a support. The term "amino group capable of being split off" denotes an amino group which can be split off from the resin support in the form of an acid amide (—CONH$_2$) together with the carboxyl group of the constituent amino acid residue of calcitonin when the molecules of the protected calcitonin derivatives produced by the solid phase method are split off from the support. Accordingly, any resins containing such an amino group can be used as the support. As is obvious to those skilled in the art, the resin support preferably does not contain an active group, other than the amino group, which reacts with the amino acid molecules. It should not be dissolved in the solvent used, but suitably it is swellable with the solvent.

Typical examples of the resin support that can be used in the present invention are as follows:

1. Benzohydrylamine type resins of the following formula

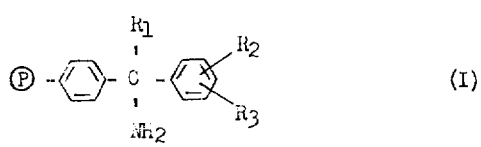    (I)

wherein P represents the main chain of the polymer, $R_1$ is a hydrogen atom or lower alkyl group, and $R_2$ and $R_3$ are the same or different and each represent a hydrogen atom, a lower alkyl group or a lower alkoxy group.

The main chain of the polymer may be those containing no substitutent reacting with the amino acid molecules and having suspended benzene ring and being swellable with organic solvents. An especially suitable main polymer chain is a styrene/divinyl benzene copolymer having recurring units of the following formula

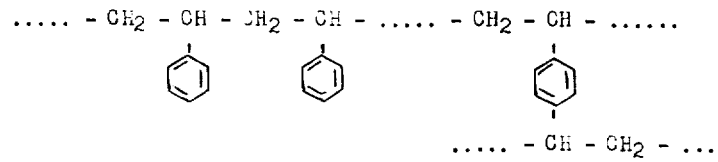

The content of divinyl benzene is preferably about 1 to 3%. If it is less than 1%, the copolymer is likely to be dissolved in organic solvents, and if it is above 3%, the copolymer does not swell in the solvent.

The lower alkyl group and lower alkoxy group represented by $R_2$ and $R_3$ are those having not more than six carbon atoms, preferably not more than four carbon atoms. Especially preferably, they are a methyl group and/or methoxy group, respectively. Accordingly, $R_2$ and $R_3$ are preferably both hydrogen atoms, methyl groups or methoxy groups, or one of them is a hydrogen atom, and the other is a methyl or methoxy group.

Furthermore, it is especially preferred that $R_2$ and $R_3$ are present at the 2- and 4-positions of the benzene ring.

2. p-Methoxybenzylamine type polymers of the following formula

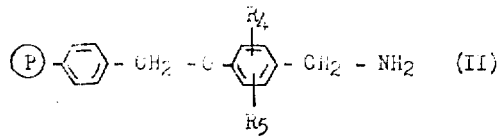    (II)

wherein P is the same as defined in the formula (I), and $R_4$ and $R_5$ are the same or different and each represent a hydrogen atom, a lower alkyl group or a lower alkoxy group.

Preferably, $R_4$ and $R_5$ are both hydrogen atoms, methyl groups or methoxy groups; or one of them is a hydrogen atom, and the other is a methyl or methoxy group.

3. Naphthyl benzylamine type polymers of the following formula

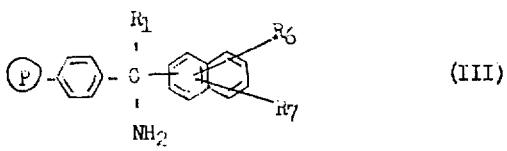    (III)

wherein P and $R_1$ are the same as defined in the formula (I), and $R_6$ and $R_7$ are the same or different and each represent a hydrogen atom, a lower alkyl group or a lower alkoxy group.

Preferably, $R_6$ and $R_7$ are both hydrogen atoms, methyl groups or methoxy groups; or one of them is a hydrogen atom, and the other is a methyl or methoxy group.

The benzohydrylamine type polymer of formula (I) is an especially preferred resin support that can be used in this invention. The polymer having the following recurring units

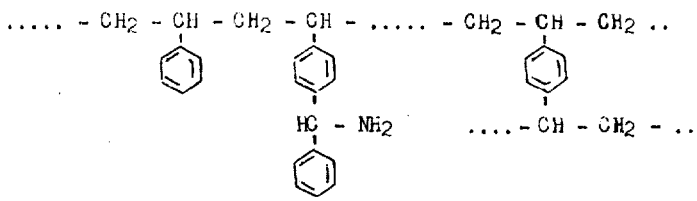

is most preferred.

Such a resin can be prepared, for example, by introducing a group of the following formula

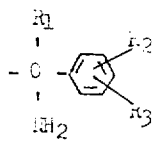

wherein $R_1$, $R_2$ and $R_3$ are the same as defined above, in an amount of 0.1 to 1.0 meq/g, preferably about 0.5 meq/g into the beads of a commercially available styrene/divinyl benzene copolymer, in a manner known per se.

Preferably, such a resin support is used in the granular form, and usually those having a particle diameter of 50 to 400 mesh, preferably 100 to 200 mesh, are used.

According to this invention, protected calcitonin molecules are formed by using the resin support described above. This can be accomplished by a method known per se in the art of peptide chemistry. However, it should be noted that a proline residue in which the imino group is protected should first be bonded through an amide linkage (—CONH—) to the splittable amino group of the support resin. After this, the imino protecting group is split off, and the remaining 31 constituent amino acid groups of calcitonin are successively introduced into the imino group of the proline residue by a method known per se in the field of peptide chemistry to grow it to a protected calcitonin precursor. The term "introduce successively," used herein, denotes not only the introduction of the constituent amino residues one by one according to the amino acid sequence of calcitonin as in the stepwise elongation of peptide chains disclosed in J. M. Stewart and J. D. Young, "Solid Phase Peptide Synthesis;" but also the introduction of two or more of the amino acid residues as fragments according to the amino acid sequence of calcitonin. The introduction of the constituent amino acid residues one by one is suitable because it can be performed by a simpler operation and the operation can be automated.

As previously stated, the protected calcitonin precursor can be prepared by any means known in the field of peptide chemistry, and therefore, a detailed description of it will be omitted here. Instead, as example, an outline of an operation of producing salmon-calcitonin will be described below.

First, a resin support containing an amino group capable of being split off is suspended in an inert organic solvent capable of swelling the resin, for example, a halogenated hydrocarbon such as methylene chloride or chloroform, a cyclic ether such as dioxane or tetrahydrofuran, or an amide such as dimethyl formamide. On the other hand, proline of the formula Y-Pro-OH (in which Y is an amino N-protective group which will be used hereinafter commonly as an N-protective group of amino acid) in which the imino group is protected is dissolved in one of the above illustrated solvents. The resulting solution is mixed with the above suspension of the resin. To the mixture was added a dehydrocondensation agent such as dicyclohexyl carbodiimide, carbonyl diimidazole, triphenyl phosphine/2,2'-dipyridyl disulfide, and the mixture is gently shaken at room temperature for several hours. The imino protective group may be a protective group which can be easily split off by treatment by a mixture of trifluoroacetic acid and methylene chloride or by hydrogen chloride in acetic acid. Examples of suitable protective groups are tertiary alkoxy carbonyl groups such as t-butyloxy carbonyl (Boc) or t-amyloxy carbonyl (Aoc), and o-nitrophenylsulfenyl (NPS). The same protective groups can be used for amino groups or imino groups of all amino acids to be introduced hereinbelow.

Thus, a resin of the following structural formula

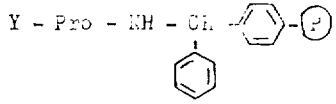

is produced.

The resin is then separated from the reaction mixture, and washed. Then, the unreacted amino group in the resin is protected by such means as acylation to make it inert to the subsequent reaction. The resin is then treated by acid under mild conditions to remove the protective group for the imino group of the proline residue. The resin is separated and washed, and neutralized with an organic base, preferably a dimethyl formamide solution of triethyl amine, followed by washing. Then, a protected amino acid derivative to be introduced in the second place (in this case, N-t-alkyloxycarbonyl-O-benzylthreonine) and a coupling reagent are added in excess (two to six times the equivalent, preferably four times the equivalent) and the mixture is gently shaken for several hours, thereby to form a resin of the following structure

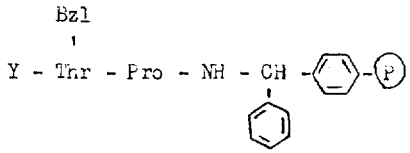

wherein Bzl is a benzyl protective group of the threonine hydroxyl group.

After the reaction, the resin is separated and washed. Then, the remaining constituent amino acid residues of salmon-calcitonin are introduced according to the sequence indicated above by the repetition of a cycle consisting of N-deprotection, washing, neutralization, washing, addition of protected amino acid and coupling reagent, reaction, washing.

The free functional groups of the amino acid molecule to be reacted, which do not participate in the reaction, can be protected by a protective group usually employed in the synthesis of long-chain peptide, which are not split off under mild acid treatment conditions but can be split off at the same time as the splitting off of the formed calcitonin precursor from the resin support. Generally, this protection is preferred. Such a protective group is well known in the art, and includes, for example, a substituted or unsubstituted benzyl group for a hydroxyl, mercapto or carboxyl group; a nitro or toluenesulfonyl group for a guanide group; a di lower alkyl methyloxycarbonyl group such as diisopropylmethyloxy carbonyl group for a pendant amino group; and a substituted or unsubstituted benzyl group, a toluenesulfonyl group or a tertiary alkyloxycarbonyl group such as t-butyloxy carbonyl group for an imino group of the imidazole ring. The choice will be obvious to those skilled in the art. Furthermore, it is preferred that the methylthio group of the methionine residue (Met) be oxidized to form a methylsulfoxide group for protection.

Thus, there can be obtained a salmon-calcitonin precursor in which the constituent amino acid residues of calcitonin are bonded straightly by a peptide bond according to the amino acid sequence of the calcitonin through an amide bond starting from the amino group of the resin support.

The inventors of the present application found that by using phenol or a mixture of it with its alkyl ether instead of the anisole, side reactions are more completely inhibited and the intended calcitonins can be produced in high yields with high purity.

Phenols which give good results are phenol and phenol derivatives such as o-cresol, m-cresol, p-cresol, resorcinol, catechol, α-naphthol, and β-naphthol. A preferred alkyl ether of phenol is anisole, and phenethol,

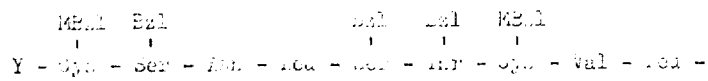

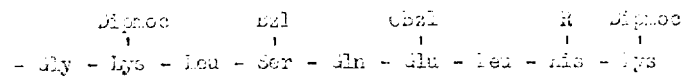

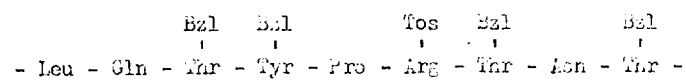

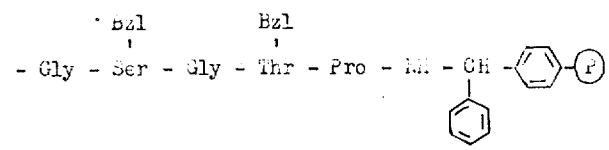

In the above formula, MBzl is a p-methoxybenzyl group, Bzl is a benzyl group, Dipmoc is a diisopropylmethyloxy carbonyl group, Tos is a p-toluenesulfonyl group, and R is a hydrogen atom, a benzyl group or a p-toluenesulfonyl group.

In the same way as above, a human-calcitonin precursor of the following structure o-, m-, and p-methylanisole can also be used. The phenols may be used alone or as mixtures with the alkyl ethers. When they are used as mixtures, the phenol should preferably be contained in a proportion of at least 50% by weight, and the higher the content of phenol is, the better is the result.

The amount of the phenol or a mixture of it with its

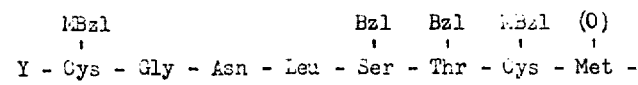

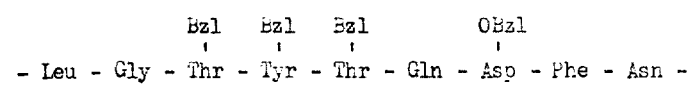

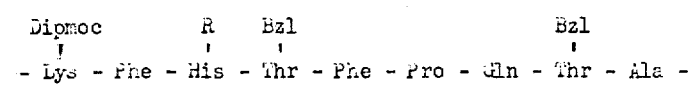

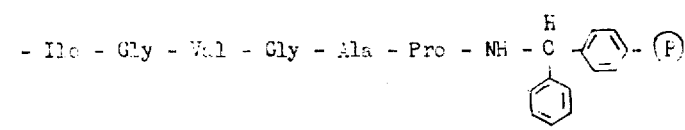

wherein Y, MBzl, Bzl, Dipmoc, Tos and R have the same meanings as above, is obtained.

The calcitonin precursor is then cleared from the resin support, and the protective groups are also split off from the precursor molecules. The clearage can be accomplished by various methods. For example, both the resin support and the protective group can be simultaneously split off by treatment with anhydrous hydrogen fluoride at −5°C., preferably at 0°C. in the presence of anisole.

alkyl ether may vary over a wide range depending upon the amount of the calcitonin precursor bonded to the resin support, the type of the protective group, etc., but generally, it is preferably about at least 0.35 mM per 100 mg of the calcitonin precursor bonded to the resin support. It is especially preferred to add it in an amount of 2.0 to 3.0 mM per 100 mg of the calcitonin precursor.

The amount of anhydrous hydrogen fluoride is not critical, and those skilled in the art can easily determine it experimentally. Usually, it is added in an amount of 1 to 10 ml., preferably 2 to 4 ml., per 100 mg of the resin precursor.

This procedure results in the splitting off of the protected calcitonin precursor molecules from the resin support, and at the same time, the protective group present in the calcitonin precursor molecules is split off to liberate the straight-chain calcitonin precursor molecules.

According to this invention, when this straight-chain calcitonin precursor is oxidized, the mercapto group of the cysteine unit at the N terminal is bonded to the mercapto group of the cysteine unit at the seventh position from the N terminal, irrespective of the types of the five amino acid units present between them or the sequence of these amino acid units, to form the cyclic disulfide structure.

Accordingly, it should be understood that the process of this invention can be applied generally to the synthesis of polypeptides having a cysteine unit at the N terminal and a second cysteine unit at the seventh position from the N-terminal with five amino acid units therebetween, and not limited to the synthesis of the salmon-, human-, bovine-, and porcine-calcitonins and their analogs.

The oxidation can be accomplished by any gentle methods which permit the selective oxidation of the mercapto group of the cysteine unit at the N terminal and the mercapto group of the cysteine unit at the seventh position from the N terminal to form the disulfide linkage. Examples of such oxidation methods are:

A. Air oxidation method

The straight-chain calcitonin precursor obtained is dissolved in a suitable buffer solution, such as a phosphoric acid buffer solution, and the solution is gently air oxidized. The pH of the phosphoric acid buffer solution is preferably 5 to 9, especially 6.5 to 8. The air oxidation can be accomplished by allowing the solution to stand in the air for 24 to 48 hours, and, if desired, for a longer period of time. As required, the solution may be stirred, or air may be blown into it. The temperature for oxidation may be a relatively low temperature, usually 10° to 30°C. in order to avoid excessive oxidation. Most preferably, it is about 20°C.

B. Oxidation with mild oxidizing agents

The straight-chain calcitonin derivative is dissolved in a solvent such as water or a lower alcohol, and a mild oxidizing agent is added to the solution. The solution is oxidized at room temperature or under cooling. Examples of such a mild oxidizing agent are hydrogen peroxide, iodine or potassium ferricyanide.

The air oxidation method is more convenient because the oxidation is more mild and the control of oxidation is easier.

Thus, the desired calcitonin in which the mercapto group of the cystein unit at the N terminal of the calcitonin precursor is bonded to the mercapto group of the cysteine unit at the seventh position from the N terminal to form a cyclic structure is produced.

The resulting calcitonin can be separated and purified by such methods as a countercurrent distribution method, a chromatographic method, or an electrophoretic method.

The calcitonin obtained by the synthetic method of this invention can be easily purified to a high purity by the above-mentioned separating and purifying methods, especially by the countercurrent distributing method only by repeating two or three times.

The resulting calcitonin can be converted to an acid addition salt using a pharmaceutically acceptable inorganic or organic acid, such as hydrochloric acid, formic acid, acetic acid, lactic acid, tartaric acid, succinic acid, benzoic acid or salicylic acid.

Thus, according to this invention, calcitonins can be synthesized in high yields and with high purity very simply by the solid-phase synthesizing method.

The following Examples illustrate the present invention in greater detail.

The measurement of the physiological activity in rats was performed by injecting the calcitonin intramuscularly and determining the amount of calcium ions in the serum of the rat by means of, for example, an atomic absorption analysis method. The value obtained was compared with the standard value to determine the potency.

EXAMPLE 1

Synthesis of Salmon-Calcitonin

1. Preparation of Resin Support

Ten grams of commercially available 2% divinylbenzene/styrene copolymer (100 to 200 mesh) was suspended in 80 ml. of nitrobenzene, and 15 g of anhydrous aluminum chloride dissolved in 60 ml. of nitrobenzene was added. With stirring, 15 ml. of benzoyl chloride was added dropwise. After the addition, the mixture was stirred at room temperature for 2 hours. Then, the resin was separated by filtration, and washed three times each with nitrobenzene, dioxane, acetic acid, and methanol in this order. Ten grams of the resin was stirred together with 100 g of ammonium formate at 165°C. for 6 hours. Then, the resin was recovered by filtration, and heated under reflux together with 100 ml. of 6N hydrochloric acid for 8 hours to form a benzohydrylamine type resin in the form of hydrochloride. This resin had an amino group content of 0.48 meq/g.

2. Introduction of Proline

A reactor equipped with a glass filter was charged with 5 g of the above resin and 20 ml. of 10% triethylamine/dimethylformamide, and was shaken gently for 10 minutes, followed by filtration. The resin was washed three times with 20 ml. of dimethyl formamide (5 minute shaking each time; the same is applicable hereinafter unless specifically indicated), and then washed three times with 20 ml. of methylene chloride. Then, 388 mg (1.8 mMols) of Boc-proline and 370 mg (1.8 mMols) of dicyclohexylcarbodiimide (DCC) were dissolved in 20 ml. of methylene chloride, and the solution was added. The solution was gently shaken for 4 hours at room temperature. After filtration, the resin was washed three times with 20 ml. of methylene chloride, and then 20 ml. of dimethyl formamide, 3 ml. of acetic anhydride and 1 ml. of triethylamine were added, and the mixture was gently shaken. After filtration, the resin was washed three times with 20 ml. of methylene chloride, three times with 20 ml. of ethanol, and three times with 20 ml. of methylene chloride to form a Boc-proline resin. This resin had a proline content of 0.20 mMol/g.

3. Introduction of Threonine

Five grams of the above Boc-proline resin was washed three times with 20 ml. of glacial acetic acid, and then, 20 ml. of 1N hydrogen chloride/acetic acid was added, and the mixture was slowly shaken for 30 minutes, followed by filtration. The resin was washed three times with 20 ml. of glacial acetic acid, three times with 20 ml. of ethanol, and then three times with 20 ml. of dimethylformamide, and then 20 ml. of 10% triethylamine/dimethylformamide was added. The mixture was shaken gently for 10 minutes, followed by filtration. The resin was washed three times with 20 ml. of dimethylformamide and then three times with 20 ml. of methylene chloride, and a solution of 1.24 g of N-Boc-O-benzylthreonine and 0.82 g of DCC, both 4 equivalents to the proline, in 25 ml. of methylene chloride was added. The mixture was gently shaken for 12 hours at room temperature. After filtration, the resin was washed three times with 20 ml. of methylene chloride, and three times with 20 ml. of ethanol.

4. Elongation of Peptide Chain

Subsequently, the above cycle was repeated to introduce the required amino acid units successively. The amount of the protected amino acid, the reaction time, and the solvent varied somewhat according to the type of the amino acid, and therefore, these factors are enumerated in Table 1 below.

Thus, 8.1 g (yield 61%) of a resin having bonded thereto a protected salmon-calcitonin precursor was obtained.

6. Cyclization and Purification

The crude peptide obtained in paragraph 5) was dissolved in 30 ml. of a 0.05 M phosphoric acid buffer (pH = 7.1) containing 0.1M NaCl, and the solution was gently stirred in an open vessel at 20°C. When the quantitatively analyzed value of the free mercapto group became less than 0.2%, the solution was acidified with 1N formic acid, and the solution was concentrated to 2 ml. at reduced pressure. It was subjected to gel filtration (elution with 0.1N formic acid) through a Sephadex G-25 column (1.5 × 80 cm), column chromatography using Cm-cellulose (gradient elution at 0.01 M to 0.5 M of ammonium acetate at pH 4.5), and droplet countercurrent chromatography [solvent = sec.-butanol : trifluoroacetic acid : water (120 : 1 : 160); the upper layer was a stationary phase and the lower layer was a moving phase]. Finally, the resin was subjected to gel filtration (elution with 0.1N formic acid) with a Sephadex G-25 column to form 12.5 mg of purified salmon-calcitonin.

That the product is a single compound can be dem-

Table 1

| Reaction Nos. | Amino acid | Equivalent | Solvent for coupling reaction (DCC) | Reaction time (hrs) | Deprotecting reagent | Remarks |
|---|---|---|---|---|---|---|
| 1 | Thr | 4 | $CH_2Cl_2$ | 12 | 1N-HCl/AcOH | |
| 2 | Gly | " | " | 4 | " | |
| 3 | Ser | " | " | " | " | |
| 4 | Gly | " | " | " | " | |
| 5 | Thr | " | " | 12 | " | |
| 6 | Asn | 6 | DMF | " | " | Introduced by the active ester method (p-nitrophenyl ester) |
| 7 | Thr | 4 | $CH_2Cl_2$ | " | " | |
| 8 | Arg | 6 | 7:3$CH_2Cl_2$.DMF | " | " | |
| 9 | Pro | 4 | $CH_2Cl_2$ | 4 | " | |
| 10 | Tyr | " | " | " | " | |
| 11 | Thr | " | " | 12 | " | |
| 12 | Gln | 6 | DMF | " | 1:1TFA-$CH_2Cl_2$ | Introduced by the active ester method (p-nitrophenyl ester) |
| 13 | Leu | 4 | $CH_2Cl_2$ | 4 | 1N-HCl/AcOH | |
| 14 | Lys | " | " | " | " | |
| 15 | His | " | " | " | " | |
| 16 | Leu | 4 | $CH_2Cl_2$ | 4 | 1N-HCl/AcOH | |
| 17 | Glu | " | " | " | " | |
| 18 | Gln | 6 | DMF | 12 | 1:1TFA-$CH_2Cl_2$ | Introduced by the active ester method (p-nitrophenyl ester) |
| 19 | Ser | 4 | $CH_2Cl_2$ | 4 | 1N-HCl/AcOH | |
| 20 | Leu | " | " | " | " | |
| 21 | Lys | " | " | " | " | |
| 22 | Gly | " | " | " | " | |
| 23 | Leu | " | " | " | " | |
| 24 | Val | 6 | " | 24 | " | |
| 25 | Cys | 4 | " | 6 | " | |
| 26 | Thr | " | " | 12 | " | |
| 27 | Ser | " | " | 4 | " | |
| 28 | Leu | " | " | " | " | |
| 29 | Asn | 6 | DMF | 12 | " | Introduced by the active ester method (p-nitrophenyl ester) |
| 30 | Ser | 4 | $CH_2Cl_2$ | 4 | " | |
| 31 | Cys | " | " | 6 | — | |

5. Cleavage from the resin 100 mg of the resin obtained in paragraph (4) above was wetted with five drops of a mixture (1 : 1) of phenol and anisole, and allowed to stand for 30 minutes at room temperature. Then, 2 ml. of anhydrous hydrogen fluoride was added, and the mixture was stirred for 90 minutes at 0°C. After complete removal of the anhydrous hydrogen fluoride, the reaction product was extracted with 0.1N formic acid. The extract was concentrated to about 1/10 at reduced pressure, and gel-filtered through a Sephadex G-25 column (1.5 × 80 cm) (eluted with 0.1 N formic acid) to form 30 mg of crude peptide.

onstrated by thin-layer chromatography on a silica gel plate [Rf = 0.7; solvent = n-butanol : pyridine : acetic acid : water (8 : 5 : 3 : 6)] or electrophoresis on polyacrylamide gel under the following conditions.

Electrophoresis conditions

1. Gel: 6M urea-containing 15% gel (pH = 4.5)
2. buffer: β-alanine/glacial acetic acid (pH = 4.5)
3. Electrophoresis: 3mA/tube, constant current, 2 hours
4. marker: methylene blue Stain Immersed in 12.5% TCA solution, and fixed; stained for 2 hours with a 1 : 20 mixture of 1% Coomassie Brilliant Blue R-250 (color index No. 42660) : 12.5% TCA; and decolorized with 10% TCA.

Results

Single band at 0.50, (Methylene blue = 1.00)

The results of amino acid analysis are shown in Table 2.

Table 2

| Arg | 1.26 | Lys | 1.82 |
|-----|------|-----|------|
| Asp | 2.23 | Pro | 2.11 |
| Cys₂ | 0.88 | Ser | 3.59 |
| Glu | 3.22 | Thr | 5.21 |
| Gly | 3.10 | Tyr | 0.78 |
| His | 0.94 | Val | 0.95 |
| Leu | 5.00 | | |

(Leu = 5.00)

The physiological activity of the product was 2,800 MRC$^u$/mg.

EXAMPLE 2

Synthesis of Human-Calcitonin

Starting from 5 g of Boc-proline resin (proline content 0.22 mMol/g) prepared in the same way as in Example 1, paragraphs (1) and (2), first alanine (Ala) units were introduced in the same way as in Example 1, and then the reaction was continued according to the arrangement of amino acids of human-calcitonin. Table 3, there was obtained 8.1 g (yield 63%) of a resin having bonded thereto a protected human-calcitonin precursor.

200 mg of this resin was treated in the same way as in Example 1 to produce crude peptide. In order to reduce methionine sulfoxide, it was reacted with 50 equivalents of β-mercaptoethanol at room temperature in 8M urea solution (pH 8.5) under nitrogen. The product was cyclized in the same way as in Example 1, and then purified by column chromatography to form 14.8 mg of pure human-calcitonin. The product was found to be a single compound as a result of thin-layer chromatography and disc electrophoresis, and had a physiological activity of 120 MRC$^u$/mg. The results of analysis of amino acids are as follows:

| Ala | 2.08 | Lys | 0.96 |
|-----|------|-----|------|
| Asp | 2.88 | Met | 0.92 |
| Cys₂ | 0.84 | Phe | 3.27 |
| Glu | 2.10 | Pro | 2.17 |
| Gly | 4.08 | Ser | 0.84 |
| His | 0.90 | Thr | 5.13 |
| Ile | 0.97 | Tyr | 0.86 |
| Leu | 2.00 | Val | 0.92 |

(as Leu = 2.00)

Table 3

| Reaction Nos. | Amino acid | Equivalent | Solvent for coupling reaction (DCC) | Reaction time (hrs) | Deprotecting reagent | Remarks |
|---|---|---|---|---|---|---|
| 1 | Ala | 4 | CH₂Cl₂ | 4 | 1N.HCl/AcOH | |
| 2 | Gly | " | " | " | " | |
| 3 | Val | 6 | " | 24 | " | |
| 4 | Gly | 4 | " | 4 | " | |
| 5 | Ile | 6 | " | 24 | " | |
| 6 | Ala | 4 | " | 4 | " | |
| 7 | Thr | " | " | 12 | " | |
| 8 | Gln | 6 | DMF | " | 1:1TFA-CH₂Cl₂ | Introduced by the active ester method (p-nitrophenyl ester) |
| 9 | Pro | 4 | CH₂Cl₂ | 4 | 1N.HCl/AcOH | |
| 10 | Phe | " | " | " | " | |
| 11 | Thr | " | " | 12 | " | |
| 12 | His | " | " | 4 | " | |
| 13 | Phe | " | " | " | " | |
| 14 | Lys | " | " | " | " | |
| 15 | Asn | 6 | DMF | 12 | " | Introduced by the active ester method (p-nitrophenyl ester) |
| 16 | Phe | 4 | CH₂Cl₂ | 4 | 1N.HCl/AcOH | |
| 17 | Asp | " | CH₂Cl₂ | " | " | |
| 18 | Gln | 6 | DMF | 12 | 1:1TFA-CH₂Cl₂ | Introduced by the active ester method (p-nitrophenyl ester) |
| 19 | Thr | 4 | CH₂Cl₂ | " | 1N.HCl/AcOH | |
| 20 | Tyr | " | " | 4 | " | |
| 21 | Thr | " | " | 12 | " | |
| 22 | Gly | " | " | 4 | " | |
| 23 | Leu | " | " | " | " | |
| 24 | Met | " | " | " | " | |
| 25 | Cys | " | " | 6 | " | |
| 26 | Thr | " | " | 12 | " | |
| 27 | Ser | " | " | 4 | " | |
| 28 | Leu | " | " | " | " | |
| 29 | Asn | 6 | DMF | 12 | " | Introduced by the active ester method (p-nitrophenyl ester) |
| 30 | Gly | 4 | CH₂Cl₂ | 4 | " | |
| 31 | Cys | " | " | 6 | — | |

EXAMPLE 3

Synthesis of Porcine-Calcitonin

In the same way as in Example 1, the peptide chain was elongated in accordance with the conditions shown in Table 5 starting from 5 g of Boc-proline resin (proline content 0.20 mMol/g) prepared in quite the same way as in Example 1, thereby to form 8.0 g (yield 62%) of a resin having bonded thereto a protected porcine-calcitonin precursor. 100 mg of this resin was similarly treated with hydrogen fluoride to cleave the precursor from the resin, and methionine sulfoxide was reduced. Then, the product was air-oxidized and then purified by column chromatography to produce 11.4 mg of pure porcine-calcitonin. The product was found to be a single compound as a result of thin-layer chromatography and disc electrophoresis. The product had a philiological activity of 84 MRC$^u$/mg. The results of amino acid analysis are shown in Table 6 below.

| Ala | 0.88 | Met | 1.01 |
|-----|------|-----|------|
| Arg | 2.11 | Phe | 3.19 |
| Asp | 3.84 | Pro | 2.04 |
| Cys$_2$ | 0.84 | Ser | 3.81 |
| Glu | 1.20 | Thr | 1.86 |
| Gly | 3.03 | Tyr | 0.87 |
| His | 0.92 | Val | 1.04 |
| Leu | 3.00 | | |

(as Leu = 3.00)

mMol/g) prepared in the same way as in Example 3, except as noted below. That is, tyrosine (Tyr) was used instead of the phenylalanine (Phe) of Reaction No. 13, aspartic acid (Asp) instead of the aspargine of Reaction No. 17, and lysine (Lys) instead of the arginine (Arg) in Reaction No. 18, and the reaction conditions were changed accordingly to suit the respective reaction conditions. Thus, there was obtained 8.1 g (yield 61%) of a resin having bonded thereto a protected bovine-calcitonin precursor. In accordance with Example 3, 12.0 mg of pure bovine-calcitonin was obtained from 100 mg of the resin. The product was found to be a single compound as a result of thin-layer chromatography and disc electrophotoresis, and had a physiological activity of 90 MRC$^u$/mg. The results of analysis of amino acid are as shown in Table 7.

| Ala | 0.90 | Lys | 0.95 |
|-----|------|-----|------|
| Arg | 1.12 | Met | 0.89 |
| Asp | 4.20 | Phe | 2.27 |
| Cys$_2$ | 0.86 | Pro | 2.16 |
| Glu | 0.94 | Ser | 3.79 |
| Gly | 3.11 | Thr | 1.90 |
| His | 0.94 | Tyr | 1.79 |
| Leu | 3.00 | Val | 0.89 |

(as Leu = 300)

What we claim is:

1. A process for synthesizing calcitonins composed of 32 amino acid units, which comprises Table 5

| Reaction Nos. | Amino acid | Equivalent | Solvent for coupling reaction (DCC) | Reaction time (hrs) | Deprotecting reagent | Remarks |
|---|---|---|---|---|---|---|
| 1 | Thr | 4 | CH$_2$Cl$_2$ | 12 | 1N.HCl/AcOH | |
| 2 | Glu | " | " | 4 | " | |
| 3 | Pro | " | " | " | " | |
| 4 | Gly | " | " | " | " | |
| 5 | Phe | " | " | " | " | |
| 6 | Gly | " | " | " | " | |
| 7 | Met | " | " | " | " | |
| 8 | Gly | " | " | " | " | |
| 9 | Ser | " | " | " | " | |
| 10 | Phe | " | " | " | " | |
| 11 | Arg | 6 | 7:3 CH$_2$Cl$_2$.DMF | 12 | " | |
| 12 | His | 4 | CH$_2$Cl$_2$ | 4 | " | |
| 13 | Phe | " | " | " | " | |
| 14 | Asn | 6 | DMF | 12 | " | Introduced by the active ester method (p-nitrophenyl ester) |
| 15 | Asn | " | " | " | " | |
| 16 | Leu | 4 | CH$_2$Cl$_2$ | 4 | 1N.HCl/AcOH | |
| 17 | Asn | 6 | DMF | 12 | " | Introduced by the active ester method (p-nitrophenyl ester) |
| 18 | Arg | " | 7:3CH$_2$Cl$_2$.DMF | " | " | |
| 19 | Trp | " | CH$_2$Cl$_2$ | 4 | 1N.HCl/AcOH β-1% mercaptol added | |
| 20 | Tyr | " | " | " | " | |
| 21 | Ala | " | " | " | " | |
| 22 | Ser | " | " | " | " | |
| 23 | Leu | " | " | " | " | |
| 24 | Val | 6 | " | 24 | " | |
| 25 | Cys | 4 | " | 6 | " | |
| 26 | Thr | " | " | 12 | " | |
| 27 | Ser | " | " | 4 | " | |
| 28 | Leu | " | " | " | " | |
| 29 | Asn | 6 | DMF | 12 | " | Introduced by the active ester method (p-nitrophenyl ester) |
| 30 | Ser | 4 | CH$_2$Cl$_2$ | 4 | " | |
| 31 | Cys | " | " | 6 | — | |

EXAMPLE 4

Synthesis of bovine-Calcitonin

The peptide chain was elongated in accordance with the conditions shown in Table 5 starting from 5 g of Boc-proline resin (having a proline content of 0.20

A. bonding a proline residue through an amide linkage to a resin support selected from the group consisting of 1. Benzohydrylamine containing polymers of the formula

17

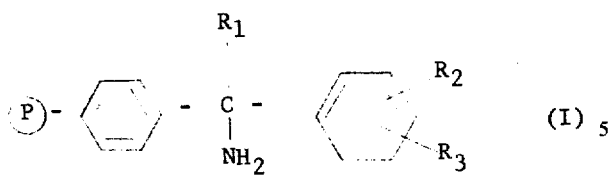

wherein ⓟ represents a styrene-divinylbenzene copolymer, $R_1$ is a hydrogen atom or lower alkyl group, and $R_2$ and $R_3$ are the same or different and each represent a hydrogen atom, a lower alkyl group or a lower alkoxy group, 2. p-Methoxybenzylamine containing polymers of the formula

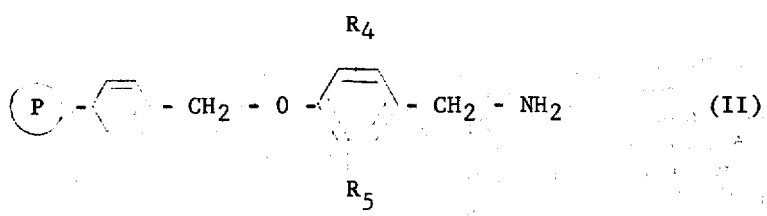

wherein ⓟ is the same as defined in the formula (I), and $R_4$ and $R_5$ are the same or different and each represent a hydrogen atom, a lower alkyl group or a lower alkoxy group, and, 3. Naphthyl benzylamine containing polymers of the formula

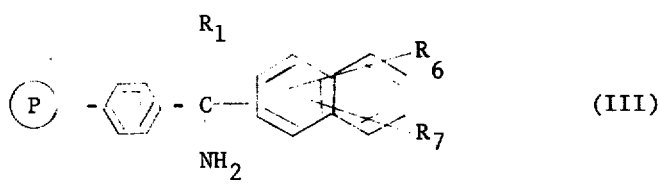

wherein ⓟ and $R_1$ are the same as defined in the formula (I), and $R_6$ and $R_7$ are the same or different and each represent a hydrogen atom, a lower alkyl group or a lower alkoxy group, B. successively introducing the remaining 31 constituent amino acid residues of calcitonin into the proline residue on the resin support according to the solid phase synthesizing method to form a calcitonin precursor, C. splitting off the resin support from the calcitonin precursor by treating the calcitonin precursor with anhydrous hydrogen fluoride in the presence of a phenol or a mixture of a phenol and alkyl ether of a phenol, and D. thereafter oxidizing the resulting dotriacontapeptide with an oxidizing agent selected from air, hydrogen peroxide, iodine or potassium ferricyanide, to bond the mercapto group of the cystein unit at the N terminal to the mercapto group of the cystein unit at the seventh position from the N terminal to form a cyclic disulfide structure.

2. The process of claim 1 wherein said resin support is a benzohydrylamine containing resin of the formula

18

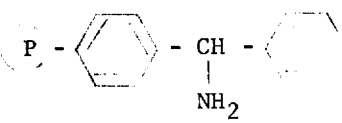

wherein ⓟ represents a styrene-divinylbenzene copolymer.

3. The process of claim 1 wherein said calcitonin is salmon-calcitonin of the following formula H-Cys-Ser-Asn-Leu-Ser-Thr-Cys-Val-Leu-Gly-Lys-Leu-Ser-Gln-Glu-Leu-His-Lys-Leu-Gln-Thr-Tyr-Pro-Arg-Thr-Asn-Thr-Gly-Ser-Gly-Thr-Pro-NH₂.

4. The process of claim 1 wherein said calcitonin is human-calcitonin of the following formula H-Cys-Gly-Asn-Leu-Ser-Thr-Cys-Met-Leu-Gly-Thr-Tyr-Thr-Gln-Asp-Phe-Asn-Lys-Phe-His-Thr-Phe-Pro-Gln-Thr-Ala-Ile-Gly-Val-Gly-Ala-Pro-NH₂.

5. The process of claim 1 wherein the splitting off of the resin support from the calcitonin precursor is carried out by treating the calcitonin precursor with anhydrous hydrogen fluoride in the presence of a mixture of at least 50% by weight based on the weight of the mixture, of the phenol and the alkyl ether of the phenol.

6. The process of claim 5 wherein the phenol is $C_6H_5OH$ and the alkyl ether of the phenol is anisole.

7. The process of claim 1 wherein said oxidation is carried out by bubbling air into a solution containing the dotriacontapeptide.

8. The process of claim 1 wherein said calcitonin is a porcine calcitonin of the formula H-Cys-Ser-Asn-Leu-Ser-Thr-Cys-Val-Leu-Ser-Ala-Tyr-Trp-Arg-Asn-Leu-Asn-Asn-Phe-His-Arg-Phe-Ser-Gly-Met-Gly-Phe-Gly-Pro-Glu-Thr-Pro-NH₂.

9. The process of claim 1 wherein said calcitonin is a bovine calcitonin of the formula H-Cys-Ser-Asn-Leu-Ser-Thr-Cys-Val-Leu-Ser-Ala-Tyr-Trp-Lys-Asp-Leu-Asn-Asn-Tyr-His-Arg-Phe-Ser-Gly-Met-Gly-Phe-Gly-Pro-Glu-Thr-Pro-NH₂.

10. The process of claim 1 wherein said oxidation is carried out by using an oxidizing agent selected from the group consisting of hydrogen peroxide, iodine, and potassium ferricyanide.

11. A peptide derivative of the formula

```
         MBzl   Bzl                  Bzl    Bzl    MBzl                        Dipmoc
          |      |                    |      |      |                            |
Y  -  Cys  -  Ser  -  Asn  -  Leu  -  Ser  -  Thr  -  Cys  -  Val  -  Leu  -  Gly  -  Lys- Bzl      OBzl            R    Dipmoc                  Bzl    Bzl
       |        |              |      |                      |      |
-  Leu  -  Ser  -  Gln  -  Glu  -  Leu  -  His  -  Lys  -  Leu  -  Gln  -  Thr  -  Tyr  -

Tos     Bzl     Bzl     Bzl           Bzl
       |       |       |       |             |
-  Pro  -  Arg  -  Thr  -  Asn  -  Thr  -  Gly  -  Ser  -  Gly  -  Thr  -  Pro  -
```

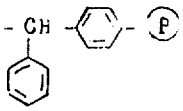

wherein Y is a protective group for the amino nitrogen atom, MBzl is a p-methoxybenzyl group, Bzl is a benzyl group, Dipmoc is a diisopropylmethyloxycarbonyl group, Tos is a p-toluenesulfonyl group, R is a hydrogen atom, a benzyl group or a p-toluenesulfonyl group, and P is a styrene/divinylbenzene copolymer.

12. A peptide derivative of the formula

```
     MBzl                            Bzl    Bzl    MBzl
      |                               |      |      |
Y  -  Cys  -  Gly  -  Asn  -  Leu  -  Ser  -  Thr  -  Cys  -  Met(O)  -  Leu  -  Gly  -

Bzl    Bzl    Bzl    OBzl                    Dipmoc           R
     |      |      |      |                        |              |
-  Thr  -  Tyr  -  Thr  -  Gln  -  Asp  -  Phe  -  Asn  -  Lys  -  Phe  -  His  -  Thr  -

Bzl
                           |
-  Phe  -  Pro  -  Gln  -  Thr  -  Ala  -  Ile  -  Gly  -  Val  -  Gly  -  Ala  -  Pro  -
```

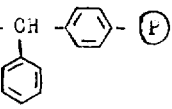

wherein Y is a protective group for the amino nitrogen atom, MBzl is a p-methoxybenzyl group, Bzl is a benzyl group, Dipmoc is a diisopropylmethyloxycarbonyl group, R is a hydrogen atom, a benzyl group or a p-toluenesulfonyl group, and ⓟ is a styrene/divinylbenzene copolymer.

13. A peptide derivative of the formula

```
         MBzl    Bzl                Bzl    Bzl    MBzl
          |       |                  |      |      |
Y  -  Cys  -  Ser  -  Asn  -  Leu  -  Ser  -  Thr  -  Cys  -  Val  -  Leu  -

Bzl          Bzl       Dipmoc   OBzl
       |            |           |      |
-  Ser  -  Ala  -  Tyr  -  Trp  -  Lys  -  Asp  -  Leu  -  Asn  -  Asn  -

Bzl    R     Tos           Bzl
       |     |      |              |
-  Tyr  -  His  -  Arg  -  Phe  -  Ser  -  Gly  -  Met(o)  -  Gly  -

OBzl    Bzl
                  |       |
-  Phe  -  Gly  -  Pro  -  Glu  -  Thr  -  Pro  -
```

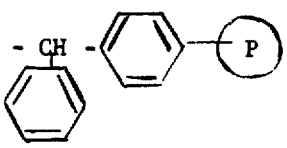

wherein Y is a protective group for the amino nitrogen atom, MBzl is a p-methoxybenzyl group, Bzl is a benzyl group, Dipmoc is a diisopropylmethyloxycarbonyl group, R is a hydrogen atom, a benzyl broup or a p-toluenesulfonyl group, and P is a styrenedivinylbenzene copolymer.

14. A peptide derivative of the formula

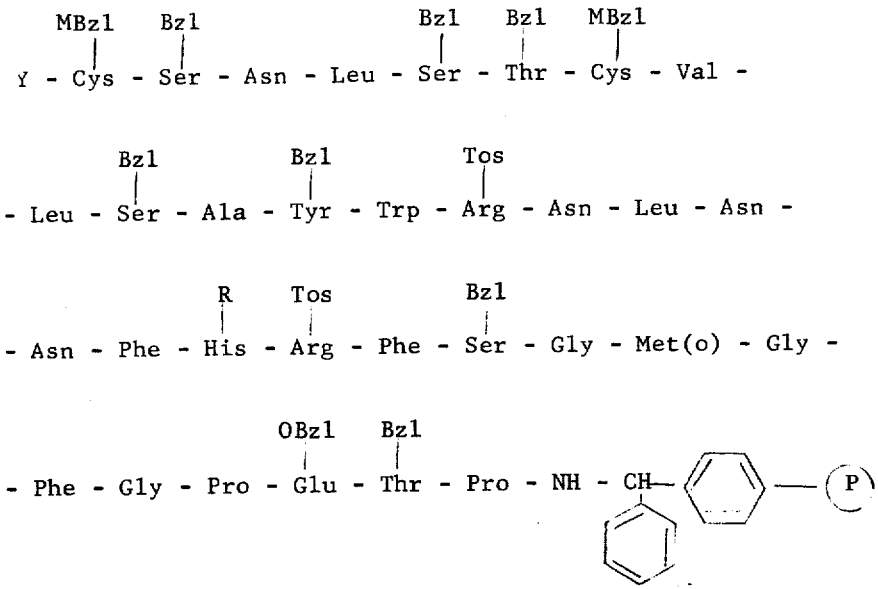

wherein Y is a protective group for the amino nitrogen atom, MBzl is a p-methoxybenzyl group, Bzl is a benzyl group, Tos is a p-toluene-sulfonyl group, R is a hydrogen atom, a benzyl group or a p-toluenesulfonyl group, and ⓟ is a styrene-divinylbenzene copolymer.

* * * * *